US010987837B2

(12) United States Patent
Gassman et al.

(10) Patent No.: US 10,987,837 B2
(45) Date of Patent: *Apr. 27, 2021

(54) METHOD AND APPARATUS FOR NONWOVEN TRIM PANELS

(71) Applicant: INTEVA PRODUCTS, LLC, Troy, MI (US)

(72) Inventors: Kenneth Gassman, Lake Orion, MI (US); Edward J. Wenzel, Troy, MI (US)

(73) Assignee: INTEVA PRODUCTS, LLC, Troy, MI (US)

(*) Notice: Subject to any disclaimer, the term of this patent is extended or adjusted under 35 U.S.C. 154(b) by 135 days.

This patent is subject to a terminal disclaimer.

(21) Appl. No.: 15/274,815

(22) Filed: Sep. 23, 2016

(65) Prior Publication Data
US 2017/0080617 A1 Mar. 23, 2017

Related U.S. Application Data

(60) Provisional application No. 62/222,608, filed on Sep. 23, 2015, provisional application No. 62/338,197, filed on May 18, 2016.

(51) Int. Cl.
B29C 45/14 (2006.01)
B29L 31/30 (2006.01)
B29C 45/00 (2006.01)

(52) U.S. Cl.
CPC .. B29C 45/14631 (2013.01); B29C 45/14221 (2013.01); B29C 45/14688 (2013.01);
(Continued)

(58) Field of Classification Search
CPC ........ B29C 45/14631; B29C 45/14688; B29C 45/14221; B60R 13/00; B29L 2031/302
See application file for complete search history.

(56) References Cited

U.S. PATENT DOCUMENTS 3,728,294 A    4/1973  Levine
5,116,557 A *  5/1992  Debaes ............... B29C 37/0032
                                                264/245
(Continued)

FOREIGN PATENT DOCUMENTS

CN    1799870 A    7/2006
DE    4214389      11/1993
(Continued)

OTHER PUBLICATIONS

International Search Report for International Application No. PCT/US2016/053489, International Filing Date Sep. 23, 2016, dated Feb. 2, 2017, 3 pages.

(Continued)

Primary Examiner — Robert C Dye
Assistant Examiner — Taryn Trace Willett
(74) Attorney, Agent, or Firm — Cantor Colburn LLP

(57) ABSTRACT

A method of forming a trim panel is provided. The method including the steps of: placing a non-woven mat of material in a heating press; heating the material to a predetermined temperature; applying a decorative film to a first surface of the heated material to create a bilaminate; placing the bilaminate layer into a cavity of a tool such that the decorative film is facing the cavity; heating the cavity; and injecting a thermoplastic resin into the tool such that the thermoplastic resin is adhered to a second surface of the material, the second surface being opposite to the first surface.

20 Claims, 17 Drawing Sheets

(52) U.S. Cl.
CPC .. *B29C 45/14811* (2013.01); *B29C 45/14786* (2013.01); *B29C 2045/0032* (2013.01); *B29C 2045/14188* (2013.01); *B29C 2045/14245* (2013.01); *B29C 2045/14729* (2013.01); *B29K 2995/007* (2013.01); *B29L 2031/302* (2013.01)

(56) References Cited

U.S. PATENT DOCUMENTS

| | | | |
|---|---|---|---|
| 5,340,642 A | | 8/1994 | Baumgartl et al. |
| 5,512,233 A | * | 4/1996 | Gallagher ........... B29C 37/0032 |
| | | | 156/245 |
| 5,656,357 A | | 8/1997 | Ogata et al. |
| 5,709,925 A | | 1/1998 | Spengler et al. |
| 5,756,406 A | | 5/1998 | Rittman et al. |
| 6,149,853 A | | 11/2000 | Luckett et al. |
| 6,547,910 B1 | | 4/2003 | Benzing et al. |
| 6,598,701 B1 | | 7/2003 | Wood et al. |
| 6,703,114 B1 | * | 3/2004 | Guiles ..................... B32B 5/18 |
| | | | 428/209 |
| 6,926,856 B2 | | 8/2005 | Hus et al. |
| 6,982,021 B2 | | 1/2006 | Spengler |
| 7,083,837 B1 | | 8/2006 | Varriano-Marston |
| 8,002,330 B2 | * | 8/2011 | Arnold .................. B29C 43/203 |
| | | | 296/146.7 |
| 9,010,834 B2 | * | 4/2015 | Preisler .................... B60N 2/91 |
| | | | 296/39.3 |
| 9,238,203 B2 | | 1/2016 | Scheibner et al. |
| 9,364,975 B2 | | 6/2016 | Preisler et al. |
| 2003/0030172 A1 | * | 2/2003 | Hoogland ......... B29C 45/14688 |
| | | | 264/161 |
| 2006/0220274 A1 | | 10/2006 | Dooley et al. |
| 2006/0222798 A1 | | 10/2006 | Brandenburg |
| 2006/0222841 A1 | * | 10/2006 | Masumizu ........ B29C 45/14336 |
| | | | 428/319.3 |
| 2007/0132132 A1 | * | 6/2007 | Saelen ..................... B32B 5/20 |
| | | | 264/46.8 |
| 2007/0160822 A1 | * | 7/2007 | Bristow .................. B29C 43/02 |
| | | | 428/304.4 |
| 2007/0184273 A1 | * | 8/2007 | MacDonald .......... B29C 45/045 |
| | | | 428/411.1 |
| 2007/0281133 A1 | * | 12/2007 | Smith ............... B29C 45/14811 |
| | | | 428/161 |
| 2010/0080970 A1 | * | 4/2010 | Hayes ................. B29C 45/1671 |
| | | | 428/209 |
| 2012/0027983 A1 | * | 2/2012 | Elia ................... B29C 45/14631 |
| | | | 428/74 |
| 2012/0286444 A1 | * | 11/2012 | Vasilj ..................... B29C 44/08 |
| | | | 264/46.4 |
| 2013/0001817 A1 | * | 1/2013 | Bessho ............... B29C 44/1209 |
| | | | 264/45.3 |
| 2013/0052412 A1 | | 2/2013 | Fox et al. |
| 2014/0193617 A1 | * | 7/2014 | Drake ............... B29C 45/14688 |
| | | | 428/203 |
| 2014/0225296 A1 | * | 8/2014 | Preisler ................... B29C 43/18 |
| | | | 264/101 |
| 2015/0321394 A1 | | 11/2015 | Preisler et al. |
| 2015/0321395 A1 | | 11/2015 | Preisler et al. |
| 2015/0321396 A1 | * | 11/2015 | Preisler ................... B29C 43/18 |
| | | | 264/511 |
| 2015/0321400 A1 | | 11/2015 | Preisler et al. |
| 2016/0082629 A1 | * | 3/2016 | Modi .................. B29C 45/1657 |
| | | | 264/28 |
| 2016/0346974 A1 | * | 12/2016 | Beau ....................... B29C 43/18 |
| 2017/0113388 A1 | * | 4/2017 | Wei ......................... B29C 33/02 |
| 2018/0085978 A1 | * | 3/2018 | Lyons ............... B29C 45/14221 |

FOREIGN PATENT DOCUMENTS

| | | |
|---|---|---|
| DE | 10255039 | 6/2004 |
| DE | 102010063751 A1 | 6/2012 |
| DE | 102014006092 A1 | 11/2014 |
| EP | 0345463 A2 | 12/1989 |
| EP | 0386818 A1 | 9/1990 |
| EP | 0476538 A1 | 3/1992 |
| KR | 20160025136 | 3/2016 |
| WO | 8810286 A1 | 12/1988 |
| WO | 2000016974 A2 | 3/2000 |
| WO | WO-0016974 A2 * | 3/2000 ............ B32B 27/12 |
| WO | 2004035303 A1 | 4/2004 |

OTHER PUBLICATIONS

Written Opinion for International Application No. PCT/US2016/053489, International Filing Date Sep. 23, 2016, dated Feb. 2, 2017, 5 pages.
Extended European Search Report for European Application No. 16849773.3 dated Mar. 14, 2019, 16 pages.
Supplementary Partial European Search Report for European Application No. 16849773.3 dated Dec. 10, 2018, 13 pages.
Third Party Observation for European Application No. 16849773.3; Observation Mailing Date Feb. 17, 2020; 3 pages.
European Search Report for European Application No. 16849773.3; Application Filing Date Sep. 23, 2016; dated Jul. 11, 2019, 14 pages.

* cited by examiner

METHOD AND APPARATUS FOR NONWOVEN TRIM PANELS

CROSS REFERENCE TO RELATED APPLICATIONS

This application claims the benefit of U.S. Provisional Application No. 62/222,608 filed on Sep. 23, 2015 and U.S. Provisional Application No. 62/338,197 filed on May 18, 2016, both of which are incorporated herein in their entirety.

BACKGROUND

This invention relates to a method and apparatus for forming nonwoven trim panels and trim panels formed by the method. More particularly, this invention relates to a method and apparatus for forming trim panels for automotive interiors.

Recent industry demands have been directed to reducing vehicle weights though the many components used in a vehicle. One area of interest for reduced vehicle weight is in the area of vehicle interiors, which may include large interior substrate panels.

Accordingly, it is desirable to provide a vehicle interior trim piece that is aesthetically pleasing while also providing structural integrity and durability where desired.

SUMMARY OF THE INVENTION

A method of forming a trim panel, comprising: placing a non-woven mat of material in a heating press; heating the material to a predetermined temperature; applying a decorative film to a first surface of the heated material to create a bilaminate; placing the bilaminate layer into a cavity of a forming mold such that the decorative film is facing the cavity; heating the cavity; closing the tool; and injecting a thermoplastic resin into the forming mold such that the thermoplastic resin is adhered to a second surface of the material, the second surface being opposite to the first surface.

An alternative method includes: placing a non-woven mat of material in a heating press; heating the non-woven mat to a predetermined temperature; heating the cavity of the forming mold; inserting a decorative film in a cavity of a forming mold, removing the heated non-woven mat from the heated press and inserting the heated non-woven mat between the forming mold half and the decorative film such that a first surface of the non-woven mat contacts the decorative film; compression forming the film and non-woven material to shape; and injecting a thermoplastic resin into the forming mold such that the thermoplastic resin is adhered to a portion of the second surface of the material, the second surface being opposite to the first surface.

In addition to one or more of the features described above, or as an alternative to any of the foregoing embodiments, the trim panel may be a portion of a vehicle interior.

In addition to one or more of the features described above, or as an alternative to any of the foregoing embodiments, the decorative film may be applied to the material via a contact roller of a roller system.

In addition to one or more of the features described above, or as an alternative to any of the foregoing embodiments, the decorative film may be loaded between the forming mold halves manually or via an automated shuttle system concurrently with or prior to the loading to the heated nonwoven mat.

In addition to one or more of the features described above, or as an alternative to any of the foregoing embodiments, the decorative film may be perforated.

In addition to one or more of the features described above, or as an alternative to any of the foregoing embodiments, the decorative film may be a layer of thermoplastic olefin laminated to a layer of foam.

In addition to one or more of the features described above, or as an alternative to any of the foregoing embodiments, the decorative film may be a thermoplastic olefin.

In addition to one or more of the features described above, or as an alternative to any of the foregoing embodiments, injection pressures of the thermoplastic resin may be limited using sequential valve gating, foaming agents, or other flow enhancers in order to significantly reduce injection pressure.

In addition to one or more of the features described above, or as an alternative to any of the foregoing embodiments, the tool may be opened and closed prior to injecting the thermoplastic resin.

In addition to one or more of the features described above, or as an alternative to any of the foregoing embodiments, edge treatment slides of the tool may be activated and pushed in laterally in order to finish a periphery edge of the part being formed.

In addition to one or more of the features described above, or as an alternative to any of the foregoing embodiments, edge treatment slides of the tool (28) are activated and pushed vertically in the direction of die draw in order to finish a periphery edge of the part being formed.

In addition to one or more of the features described above, or as an alternative to any of the foregoing embodiments, the predetermined non-woven mat preheat temperature may be in the range of 200-210 degrees Celsius.

In addition to one or more of the features described above, or as an alternative to any of the foregoing embodiments, the decorative film may be heated prior to placement in the cavity of the forming mold.

In addition to one or more of the features described above, or as an alternative to any of the foregoing embodiments, the decorative film may be heated after placement in the cavity of the forming mold but prior to inserting the non-woven mat.

In addition to one or more of the features described above, or as an alternative to any of the foregoing embodiments, a trim piece is formed by the method of any of the features described above.

In yet another embodiment, a method of forming a trim panel is provided. The method includes the steps of: placing a non-woven mat of material in a heating press; heating the material to predetermined temperature; applying a thermoplastic topcoat into a cavity of a forming mold; heating the cavity; placing the material into the cavity such that a first surface of the material is adhered to the thermoplastic topcoat; closing the tool; and injecting a thermoplastic resin into the tool such that the thermoplastic resin is adhered to a portion of the second surface of the material, the second surface being opposite to the first surface.

In addition to one or more of the features described above, or as an alternative to any of the foregoing embodiments, the trim panel may be a portion of a vehicle interior.

In addition to one or more of the features described above, or as an alternative to any of the foregoing embodiments, the topcoat may be sprayed into the cavity.

In addition to one or more of the features described above, or as an alternative to any of the foregoing embodiments, the injection pressures of the thermoplastic resin may be limited using sequential valve gating, foaming agents, or other flow enhancers in order to significantly reduce injection pressure.

In addition to one or more of the features described above, or as an alternative to any of the foregoing embodiments, the tool may be opened and closed prior to injecting the thermoplastic resin.

In addition to one or more of the features described above, or as an alternative to any of the foregoing embodiments, edge treatment slides of the tool may be activated and pushed in laterally in order to finish a periphery edge of the part being formed.

In addition to one or more of the features described above, or as an alternative to any of the foregoing embodiments, edge treatment slides of the tool may be activated and pushed vertically in the direction of die draw in order to finish a periphery edge of the part being formed.

In addition to one or more of the features described above, or as an alternative to any of the foregoing embodiments, the predetermined non-woven preheat temperature may be in the range of 200-210 degrees Celsius.

In addition to one or more of the features described above, or as an alternative to any of the foregoing embodiments, a trim piece is formed by the method of any of the forgoing features.

In yet another embodiment, a trim panel is provided. The trim panel having: a non-woven mat of material; a decorative film applied to a first surface of the heated material to create a bilaminate; and a thermoplastic resin secured to a portion of a second surface of the material, the second surface being opposite to the first surface.

In addition to one or more of the features described above, or as an alternative to any of the foregoing embodiments, the trim panel may be a portion of a vehicle interior.

In addition to one or more of the features described above, or as an alternative to any of the foregoing embodiments, the decorative film may be perforated.

In addition to one or more of the features described above, or as an alternative to any of the foregoing embodiments, the trim panel may be a portion of a vehicle door.

BRIEF DESCRIPTION OF THE DRAWINGS

Other features, advantages and details appear, by way of example only, in the following description of embodiments, the description referring to the drawings in which.

Figure 1:
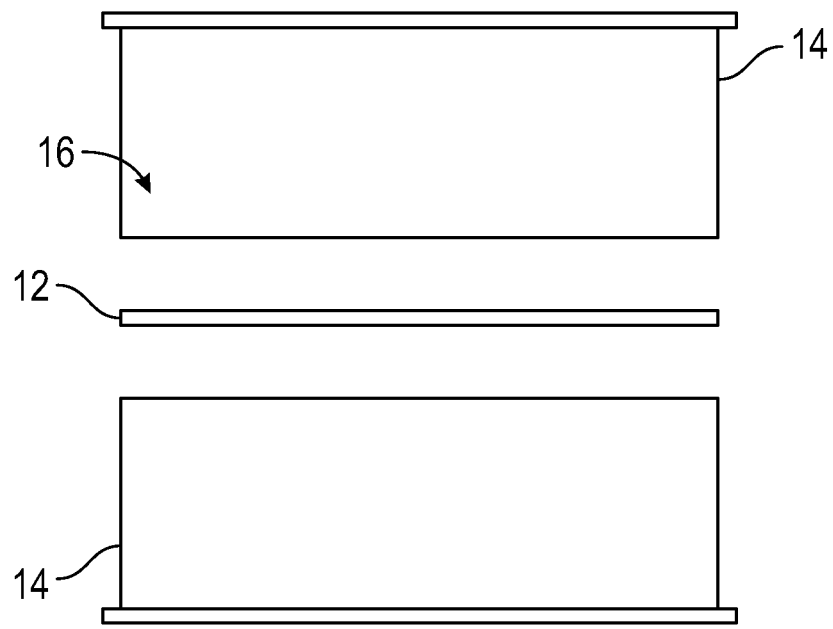
FIGS. 1-10 illustrate a method and apparatus for forming a decorative trim panel in accordance with one non-limiting embodiment of the disclosure.

Although the drawings represent varied embodiments and features of the present invention, the drawings are not necessarily to scale and certain features may be exaggerated in order to illustrate and explain exemplary embodiments the present invention. The exemplification set forth herein illustrates several aspects of the invention, in one form, and such exemplification is not to be construed as limiting the scope of the invention in any manner.

DETAILED DESCRIPTION

Turning now to the drawings, wherein to the extent possible like reference numerals are utilized to designate like components throughout the various views, in FIGS. 1-10 it is seen that a method and apparatus for forming a decorative trim panel in accordance with one non-limiting embodiment of the disclosure is presented. In accordance with various embodiments of the present invention a method of producing a first surface finished non-woven directly from the compression/injection tooling. As such, secondary tooling and processes may now be required only for localized cladding and final assembly operations.

In one embodiment, a decorative film thermoplastic olefin (such as TPO compact sheet) is used to achieve a hard, grained surface finish of the product or trim piece. In a first step, a non-woven mat 12 is heated to an appropriate processing temperature, which may be for example 200-210 degrees Celsius. Temperatures greater or less than the aforementioned range are considered to be within the scope of various embodiments.

Heating may be achieved by contact, hot air or IR heat. The non-woven mat may be heated to a first temperature on a first side and a second temperature on a second side wherein the first temperature does not equal the second temperature.

The fibers of the mat 12 may include natural fibers, manmade fibers or a combination of both, with a high length-to-width ratio and suitable characteristics for being processed into the mat. Some non-limiting exemplary fiber types may be polypropylene, polyester, kenaf, hemp, flax, jute, sisal, glass, and carbon. In some embodiments the fibers are a combination of flax fibers and polypropylene fibers. The non-woven mat, prior to heating, may have a thickness of 5 to 25 mm, or, 7 to 20 mm. The non-woven mat, prior to heating, may have an areal weight of 600 to 2500 grams per square meter ($g/m^2$), or 700 to 2000 $g/m^2$.

Figure 2:
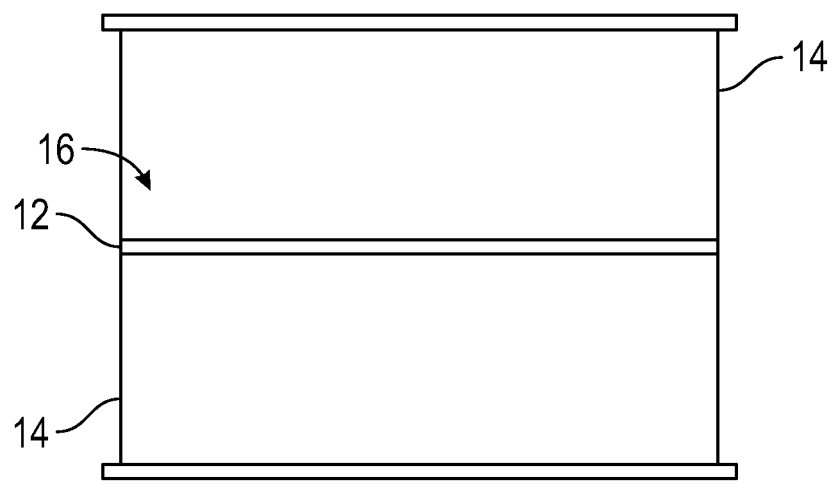
Figure 3:
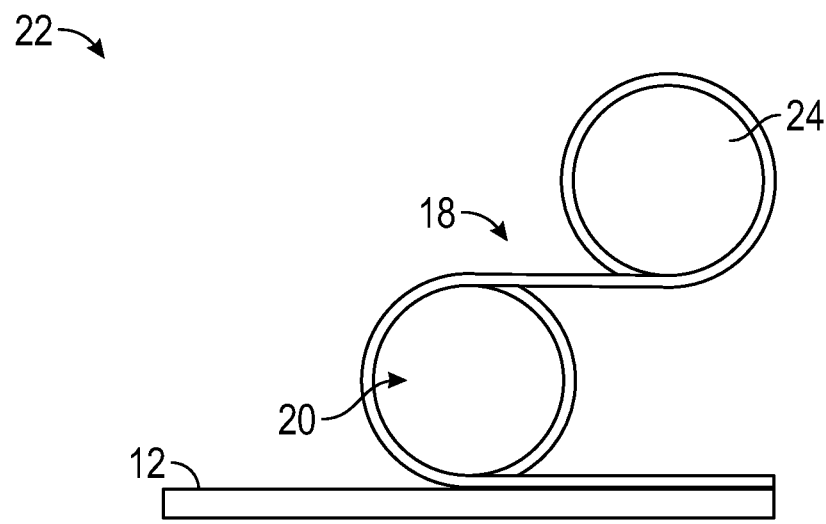
Figure 4:
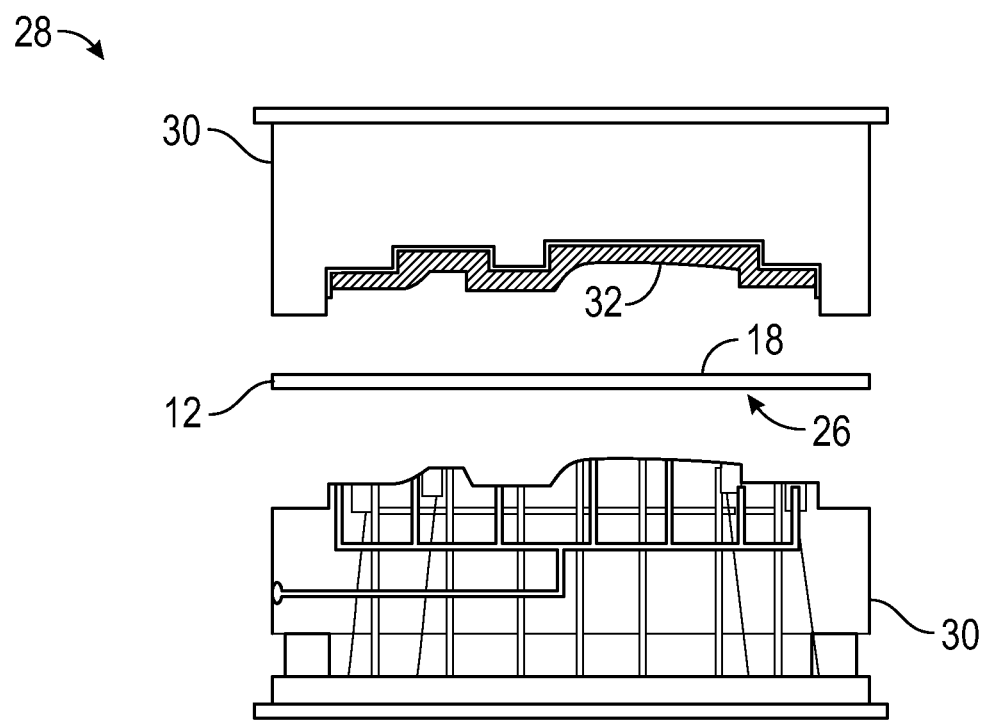

In one embodiment and as illustrated in FIG. 1, the nonwoven material or mat 12 is placed between a pair of plates 14 of a contact heating press or oven 16. In FIG. 2, the press is closed and the material 12 is heated.

Once the material 12 is heated to the desired temperature a decorative film 18 is applied to the heated nonwoven mat 12. The film may be applied by a contact roller 20 or roller system 22 having a contact roller 20 and a supply spool 24 of the decorative film 18. The film 18 may be perforated in order to aid in the release of trapped air or gases between the film 18 and the nonwoven material 12 during forming.

In some embodiments, the decorative film 18 is a thermoplastic olefin (such as TPO compact sheet) in order to achieve a hard, grained surface finish of the product or trim piece. The decorative film may have a thickness of 0.1 to 1.1 millimeters (mm), or 0.2 to 0.7 mm, or 0.2 to 0.5 mm.

In some embodiments, the decorative film 18 is a layer of thermoplastic olefin laminated to a layer of foam. The thickness may be 0.6 mm to 4.7 mm.

Figure 5:
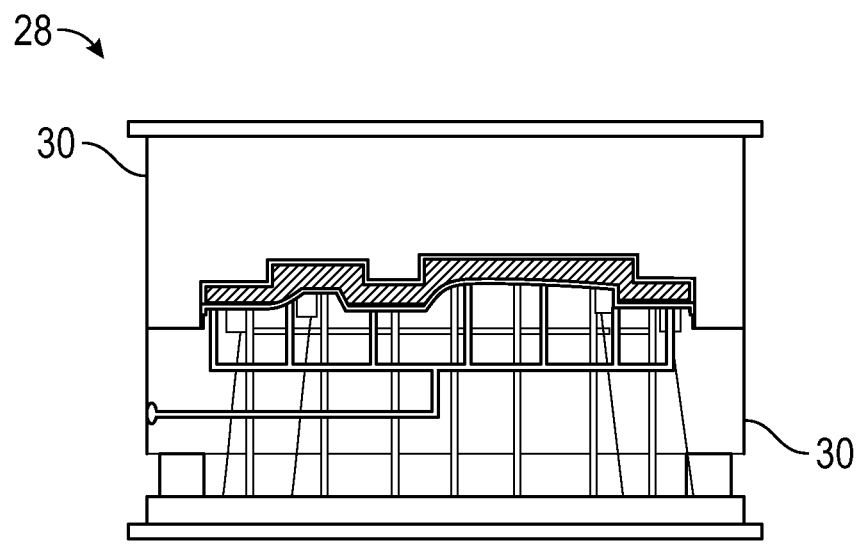
Figure 6:
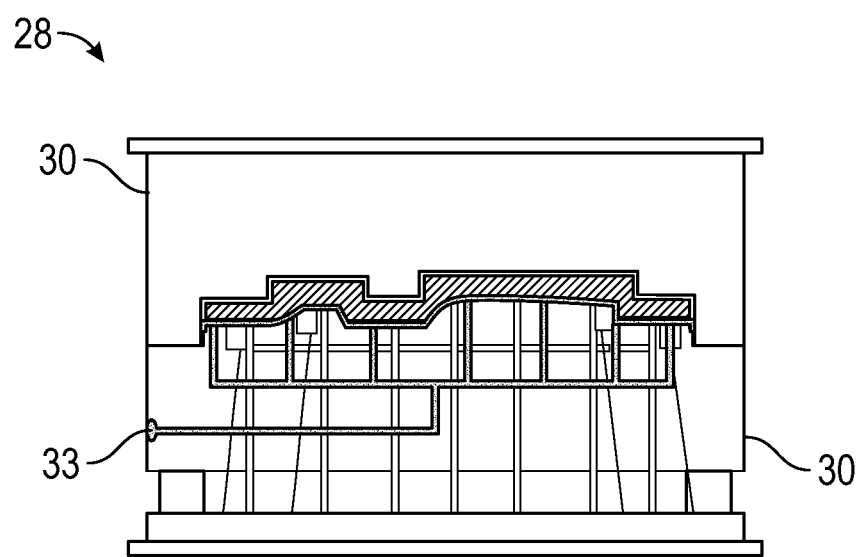

The film 18 now clad with the nonwoven material 12 is illustrated as a bilaminate 26 which is then transferred to a compression/injection tool 28, illustrated in at least FIGS. 5-8. The heated film-clad nonwoven layer 26 is placed between the two complimentary halves 30 of the tool 28. In one embodiment, the mold cavity 32 of one of the halves 30 is heated. The cavity half 30 of the tool 28 that is heated is heated near or adjacent to the show surface of the part (e.g., layer 18, the surface of the door panel in FIG. 32) in order to provide a uniform gloss and consistent grain depth replication across the entire part surface. In FIG. 5, the press or tool 28 is closed and graining and forming layer 26 occurs in order to form a final part shape. The use of heat in the cavity provides a controllable gloss to the show surface of the part. This is in part due to the depth of the grain cavities in the tool of cavity 32. The gloss of the show surface is greater for lower grain cavity depths while a lower gloss is provided with higher grain cavity depth. In addition, improved gloss consistency also results from a more uniform and precise polymer replication of the mold surface which is elevated in temperature, and as such the gloss consistency is provided regardless of grain type or depth. Thus, changing the grain depth is not required in order to realize desired visual enhancements of the show surface.

In some embodiments the cavity is porous or has small vent holes to allow any out gas to escape from the materials being molded. In some embodiments the mold is closed, briefly opened to allow any out gas to escape and then closed to complete the molding operation.

Shortly after the press or mold is closed, a thermoplastic resin 33 is injected behind the nonwoven material, producing backside attachment features and reinforcing ribs of the part being formed. The mold can be either heated or cooled at this step. This is illustrated in at least FIG. 6.

Figure 7:
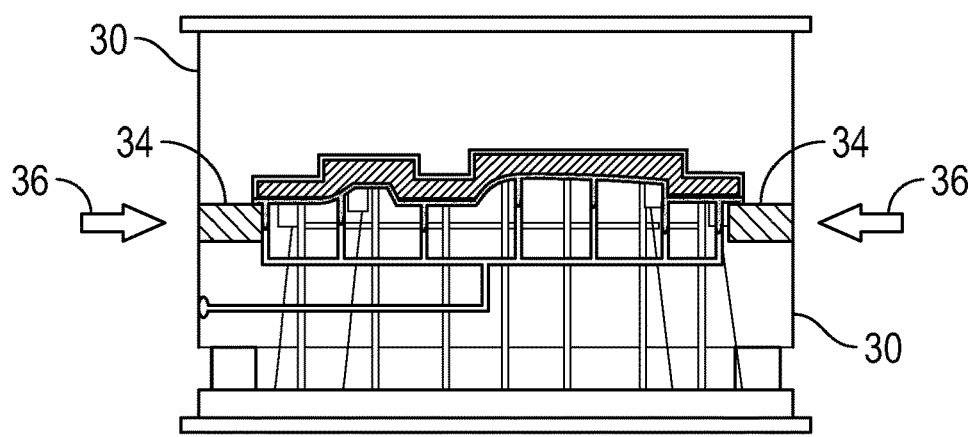

During the next step and as illustrated in at least FIG. 7, edge treatment slides 34 are activated and pushed in laterally in the direction of arrows 36 in order to finish a periphery edge of the part being formed. This step is performed when the mold is unheated or cold.

Figure 8:
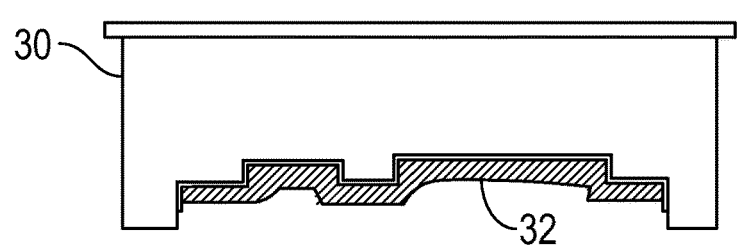
Figure 8:
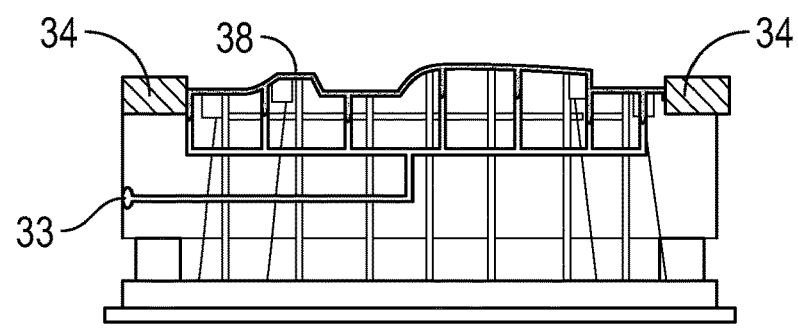
Figure 9:
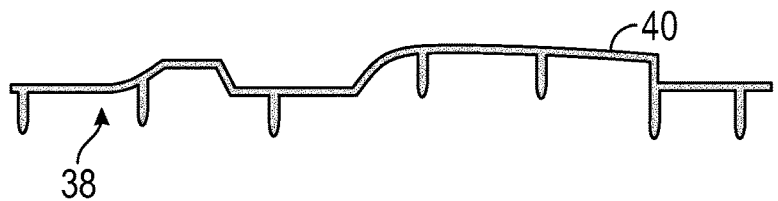
Figure 31:
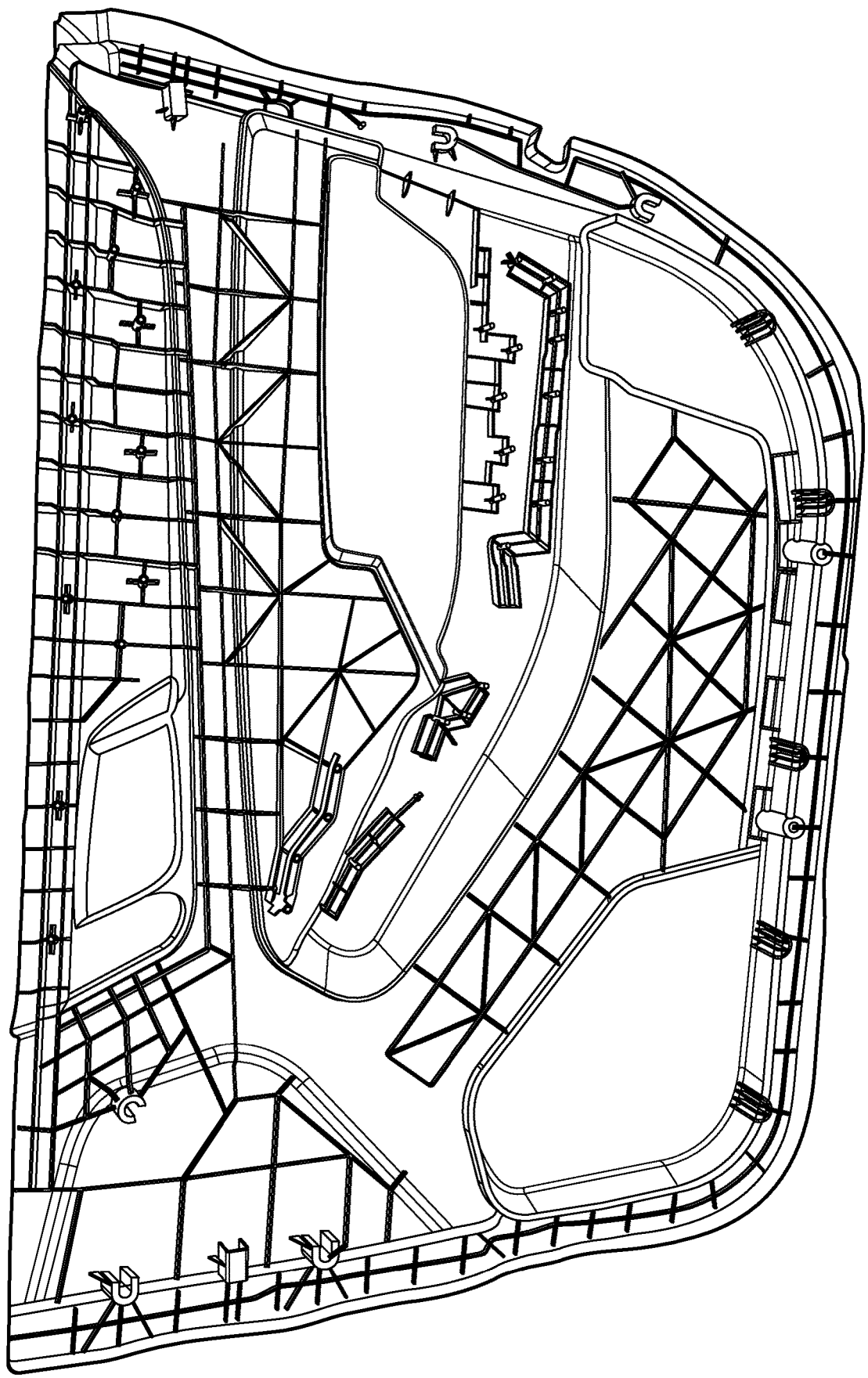
FIG. 31-32 illustrate a door panel in accordance with another non-limiting embodiment of the disclosure.

At the next step and as illustrated in at least FIG. 8, the mold or press is opened and a formed part 38 is demolded. In the demolded part, the combination of the nonwoven mat and the decorative skin may have a thickness of 0.5 to 2.5 mm, or, 0.9 to 1.5 mm. In one embodiment, the part 38 may be a portion of a vehicle interior such as a trim panel, console, door panel (FIG. 31, FIG. 32) or instrument panel or any other product that has a show surface and where structural integrity and light weight are desired. Upon demold, the part 38 is transferred to secondary tooling (not shown) for trimming of internal openings, application of localized claddings, and final assembly. The compression/injection process described above produces a film clad nonwoven part that emulates a mold-to-color grained injection molded thermoplastic product at a significantly reduced mass.

Figure 32:
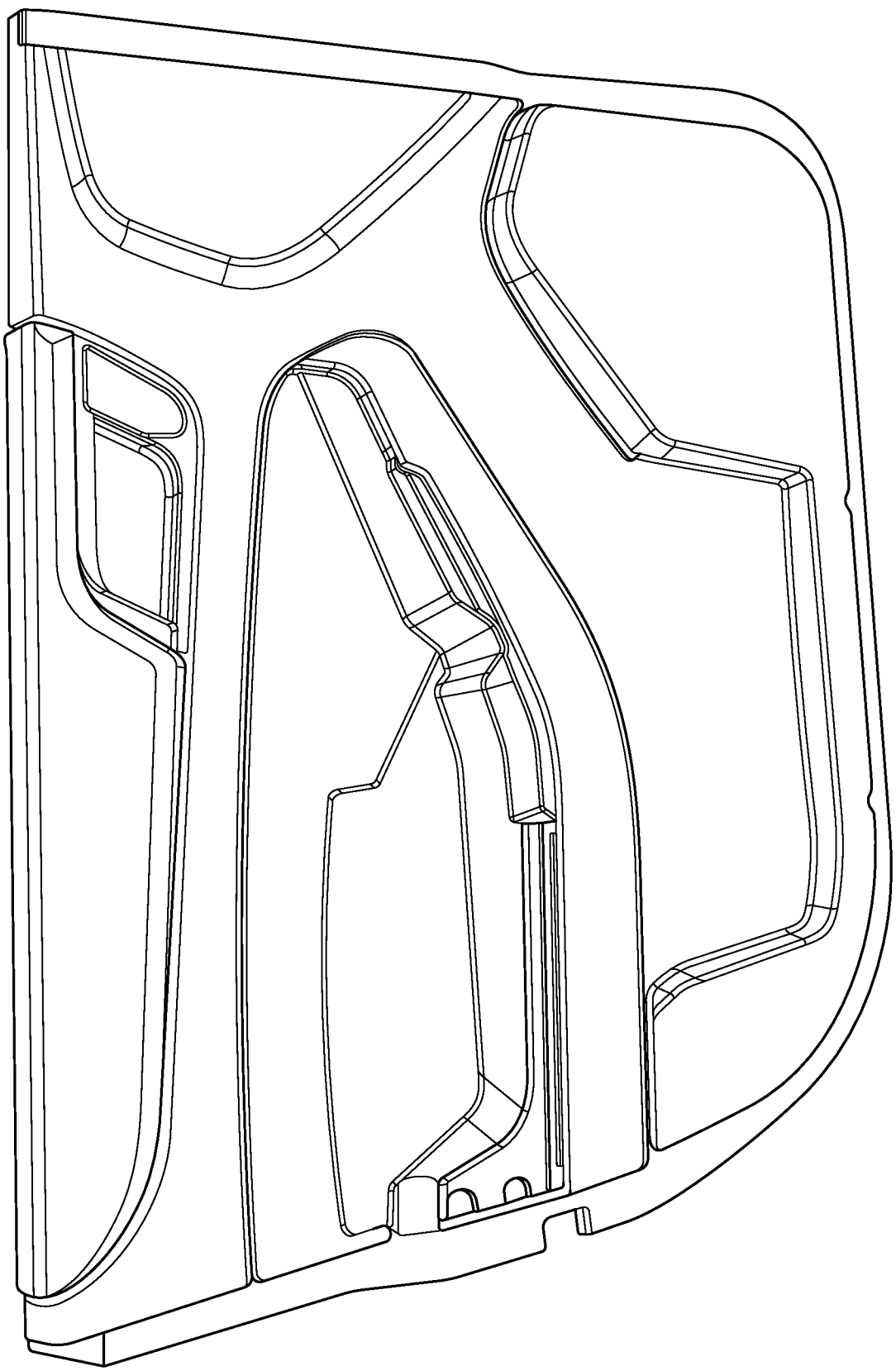

In one embodiment, the injection pressures may be limited in order to reduce or eliminate read through of the back the injected features onto the show surface 40 of the part 38 (e.g. FIG. 32 shows a door panel show surface) as well as to ensure filling of these features. Use of sequential valve gating of the injection drops and higher melt flow thermoplastic materials are typically used to minimize the injection pressure. In one embodiment of the present invention foaming agents (either chemical or physical) are used in the polymer to significantly reduce injection pressure while enabling the use of a highly filled thermoplastic resin to achieve the desired level of mechanical properties within the polymer.

As noted above, gloss variation on the show surface of the part resulting from inconsistent injection and forming pressures is eliminated via the use of rapid heating and cooling technology incorporated into the cavity half of the compression/injection tooling. By elevating the temperature of the mold cavity during compression this will ensure that tooling surface will be replicated uniformly across the part and fibers will be contained beneath the surface 40 of the part 38. Elevated mold temperature can be maintained during the back injection phase to further improve surface appearance. The tooling is then cooled sufficiently prior to back injection and subsequent part demold.

Variations of the above process in order to achieve a hard, class A surface appearance may comprise the use of a polymer based nonwoven applied to either the top or both top and bottom surface of the reinforced nonwoven blank. For example and as used herein, a polymer based nonwoven contains only polymeric fibers, and thus, no natural, glass or other reinforcing fibers. Without being bound by theory, it is believed that these fibers, if concentrated on the top or top and bottom of the nonwoven blank, would provide a class A surface when pressure is applied during compression forming under heat, and cover the reinforcing fibers present in the conventional nonwoven blank. The polymer only nonwoven is used on the A side of the part for aesthetics. If however, the constructed parts warps upon demold, then a second polymer-only nonwoven may be applied to the B side of the nonwoven blank (or reinforced nonwoven) to balance the forces due to differential shrink between the reinforced nonwoven and the polymer-only nonwoven. A polymer based non-woven or thermoplastic film can also be used on the B side of the part to improve material flow during back injection as well as provide a barrier (physical and thermal) against rib readthrough on the first surface of the part. Application of a thermoplastic film prior to heating of the nonwoven material is also contemplated.

Figure 10:
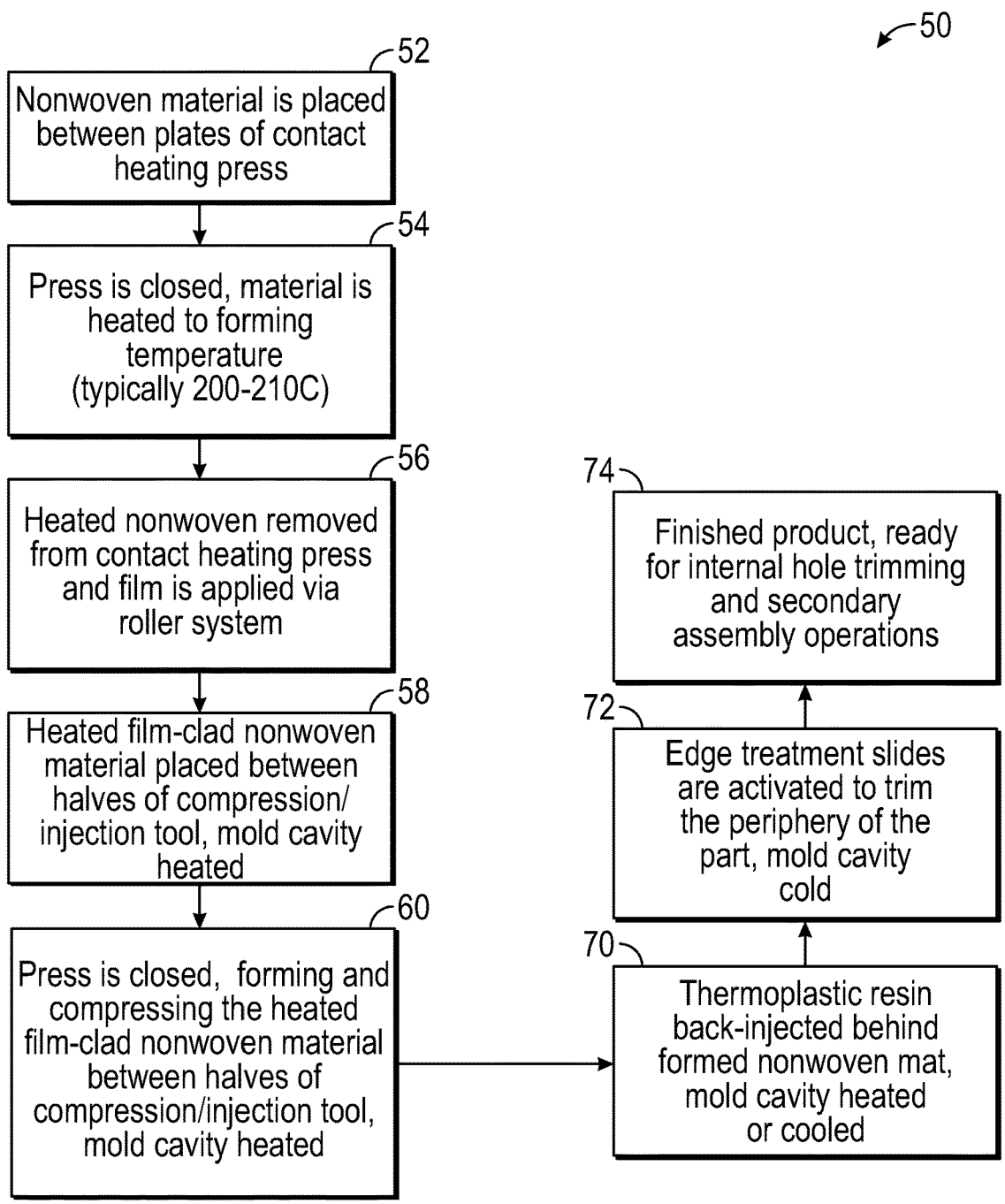

Referring now to FIG. 10, a method 50 for forming the trim component or part 38 in accordance with one non-limiting embodiment is illustrated. As mentioned above and at step 52, a nonwoven material is placed between plates of contact heating press. Thereafter and at step 54, the press is closed and the material is heated to forming temperature (typically 200-210 C). Thereafter and at step 56, the heated nonwoven material is removed from the contact heating press and a film is applied via roller system. Thereafter and at step 58, the heated film-clad nonwoven material is placed between halves of compression/injection tool and the mold cavity is heated. Thereafter and at step 60, the press is closed, and the heated film-clad nonwoven material is formed and compressed between halves of compression/injection tool while the mold cavity heated. Thereafter and at step 70, a thermoplastic resin is back-injected behind the formed nonwoven mat while the mold cavity heated. Thereafter and at step 72, edge treatment slides are activated to trim the periphery of the part and the mold cavity is cold or unheated. At step 74, the finished product is removed from the tool and is, ready for internal hole trimming and secondary assembly operations.

In yet another embodiment and as illustrated in FIGS. 11-20, an alternative embodiment of the present invention is illustrated. Here a thermoplastic spray topcoat 40 may be applied to either to the tool cavity 32 or nonwoven material blank 12 prior to forming and back injection. This is in lieu of the roller applied film 18 or alternatively may be in combination with the roller applied film 18. The process includes the following steps.

Figure 11:
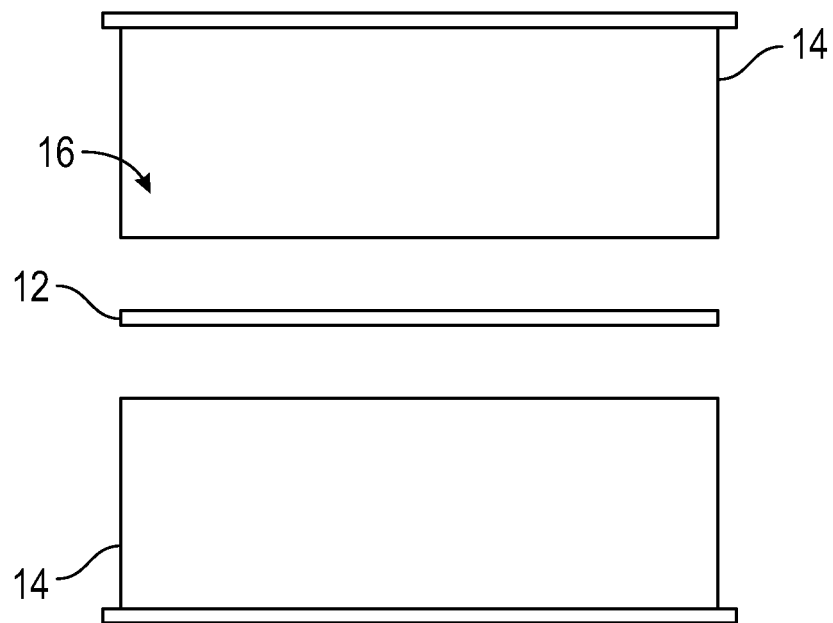
FIG. 11-20 illustrate a method and apparatus for forming a decorative trim panel in accordance with another non-limiting embodiment of the disclosure.
Figure 12:
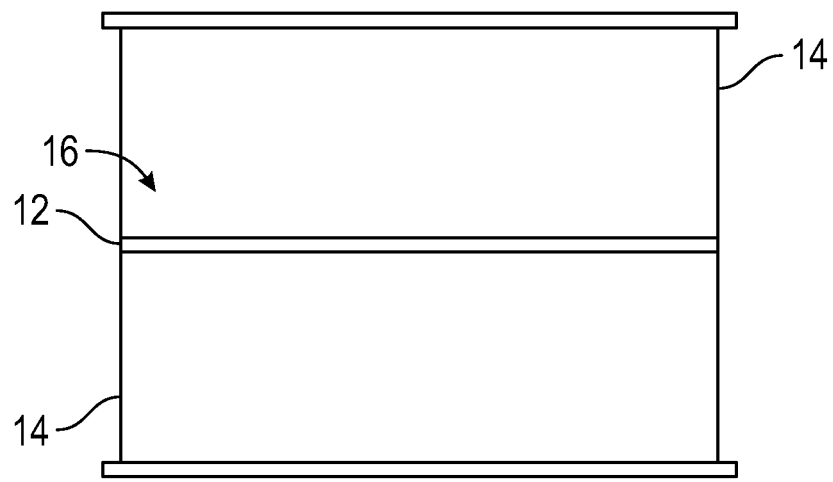
Figure 13:
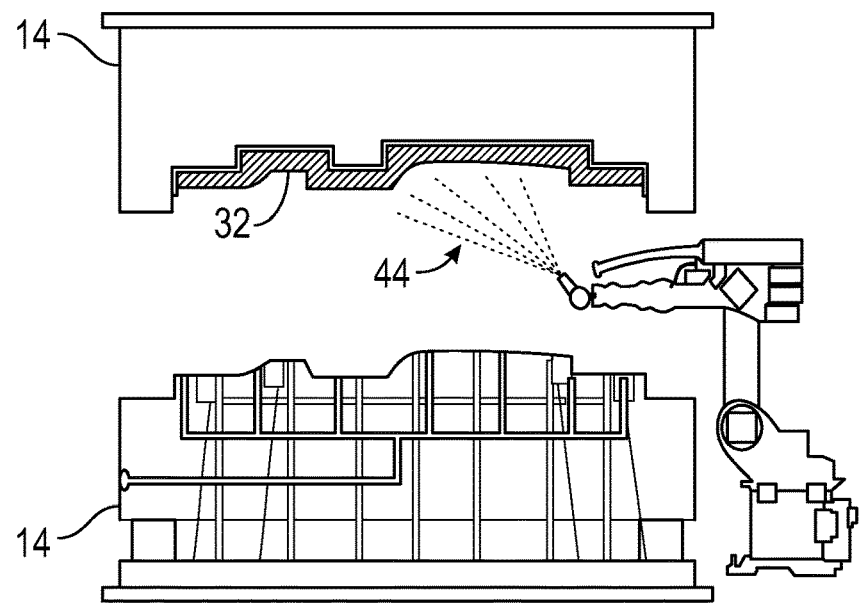
Figure 14:
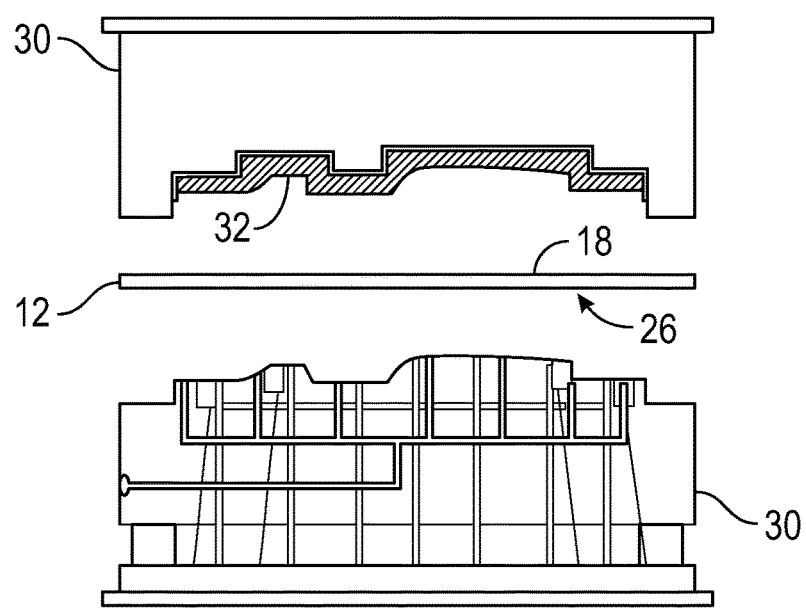
Figure 15:
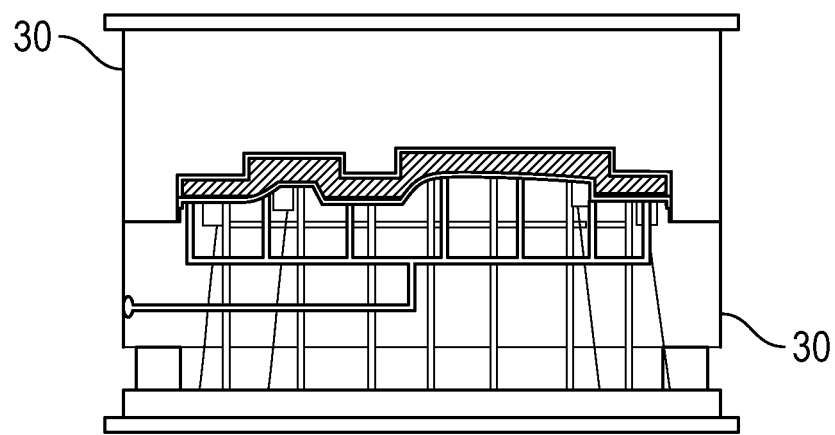

First, a nonwoven fibrous mat 12 is heated (via contact or IR heat) in an oven 16 to an appropriate processing temperature (FIGS. 11 and 12). A thermoplastic polymer topcoat 44 is sprayed onto the mold cavity 32 prior to heating or alternatively after heating of the mold cavity. The heated non-woven material 12 is removed from the oven 16 and is placed in the mold cavity 32 and the tool is closed. The tool may be opened briefly to allow for out gas to escape and then closed to finish the forming of the part. After the press is closed, graining and forming of the topcoat 44 to the nonwoven material 12 occurs and the part is formed into a final part shape.

Figure 16:
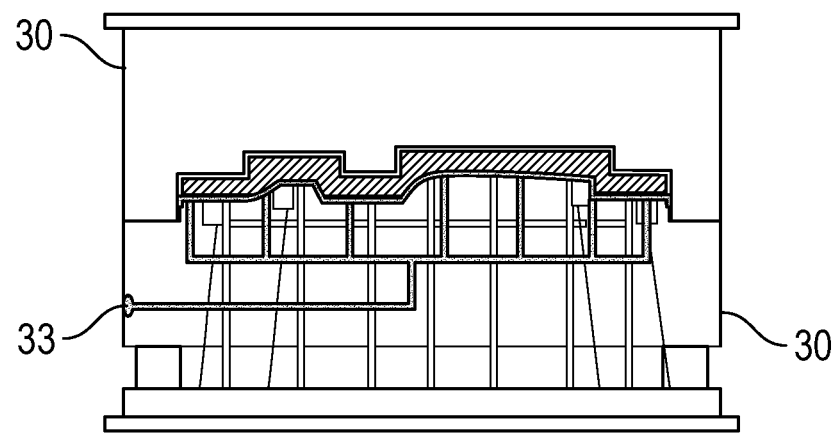
Figure 17:
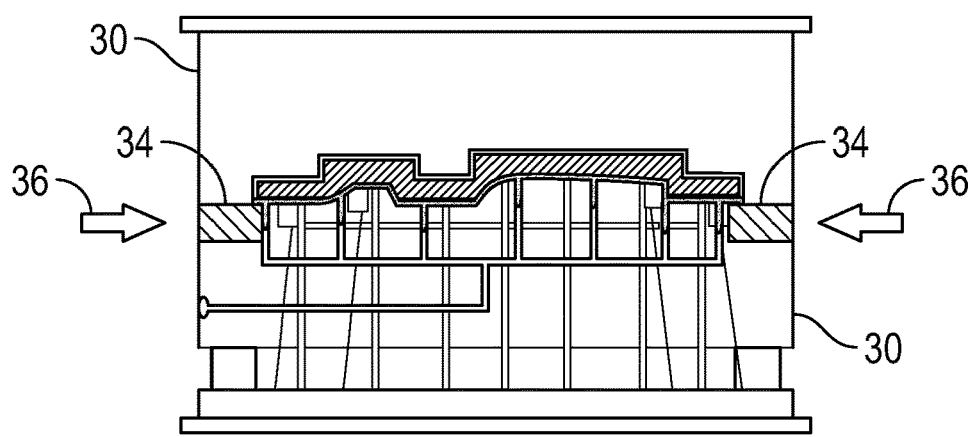

Shortly after mold close, a thermoplastic resin 33 is injected behind the nonwoven material 12, producing backside attachment features and reinforcing ribs (FIG. 16). In FIG. 17, the edge treatment slides 34 are activated in the direction of arrows 36 to finish the periphery edge of the part 38 while the tool is cold or cooling.

Figure 18:
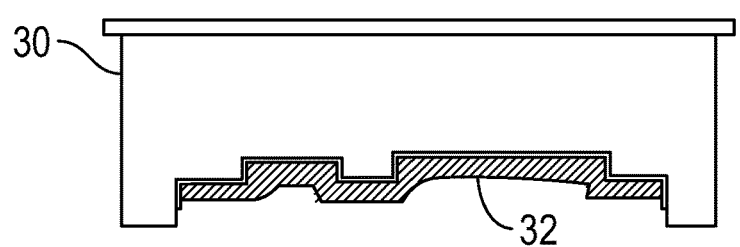
Figure 18:
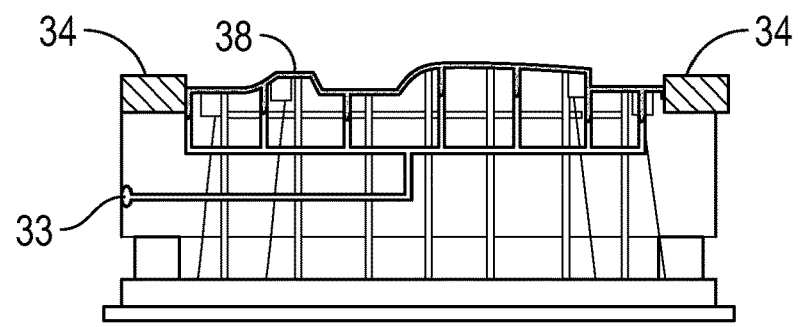
Figure 19:
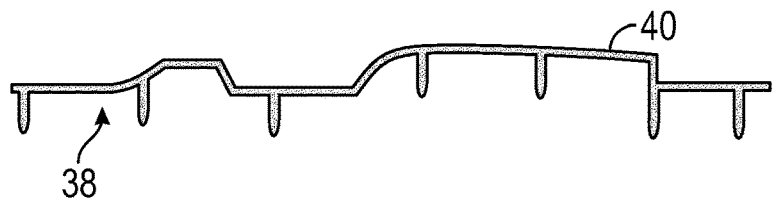

In FIG. 18, the mold opens and the part 38 is demolded. In this embodiment, the topcoat 44 material thickness will be uniform across the entire part surface and not subjected to thinning during part formation if applied directly to the tool cavity 32.

Figure 20:
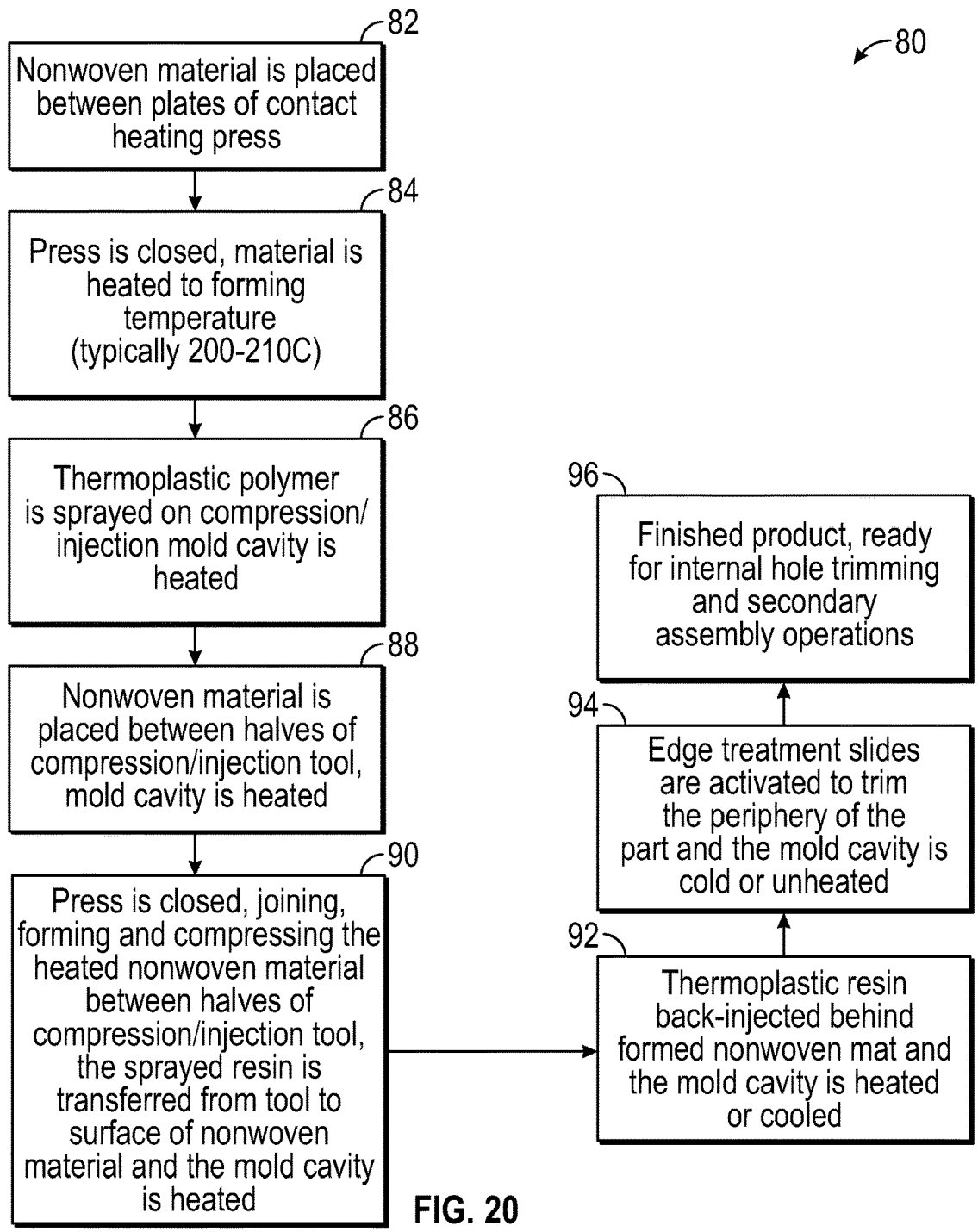

Referring now to FIG. 20 a method 80 for forming the trim component or part 38 in accordance with one non-limiting embodiment is illustrated. As mentioned above and at step 82 a nonwoven material is placed between plates of contact heating press. Thereafter and at step 84, the press is closed and the material is heated to forming temperature (typically 200-210 C). Thereafter and at step 86, a thermoplastic polymer topcoat is sprayed on compression/injection mold cavity, mold cavity is heated. Thereafter and at step 88, the nonwoven material is placed between halves of compression/injection tool, and the mold cavity is heated. Thereafter and at step 90, the press is closed, forming and compressing the heated nonwoven material between halves of compression/injection tool, the sprayed resin is transferred from tool to surface of nonwoven material and the mold cavity is heated. Thereafter and at step 92, a thermoplastic resin is back-injected behind the formed nonwoven mat while the mold cavity heated. Thereafter and at step 94, edge treatment slides are activated to trim the periphery of the part and the mold cavity is cold or unheated. At step 96, the finished product is removed from the tool and is, ready for internal hole trimming and secondary assembly operations.

Figure 21:
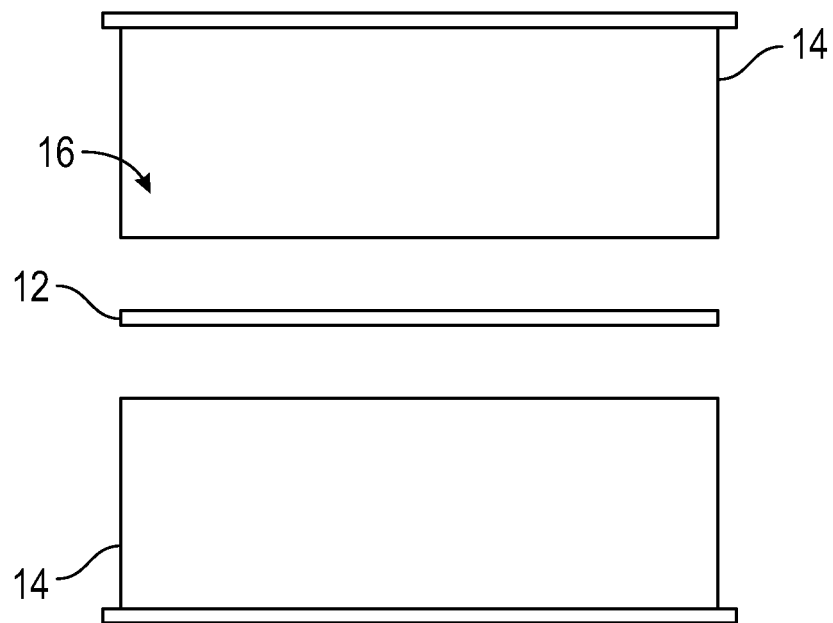
FIG. 21-30 illustrate a method and apparatus for forming a decorative trim panel in accordance with another non-limiting embodiment of the disclosure.
Figure 22:
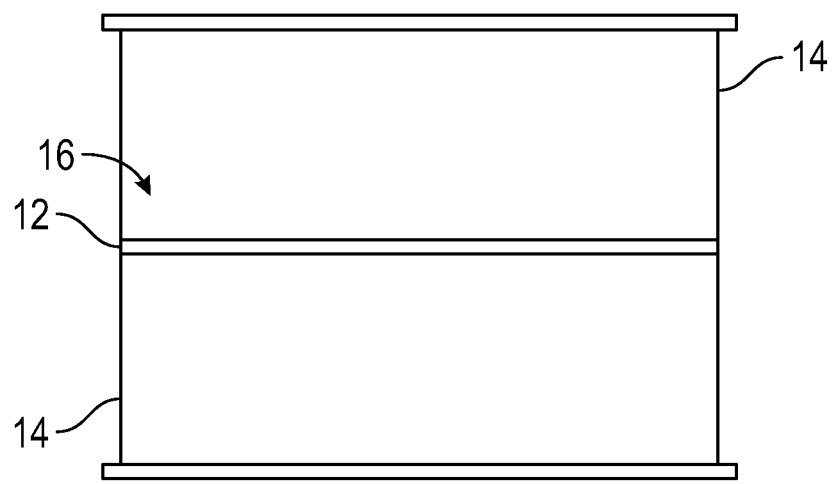
Figure 23:
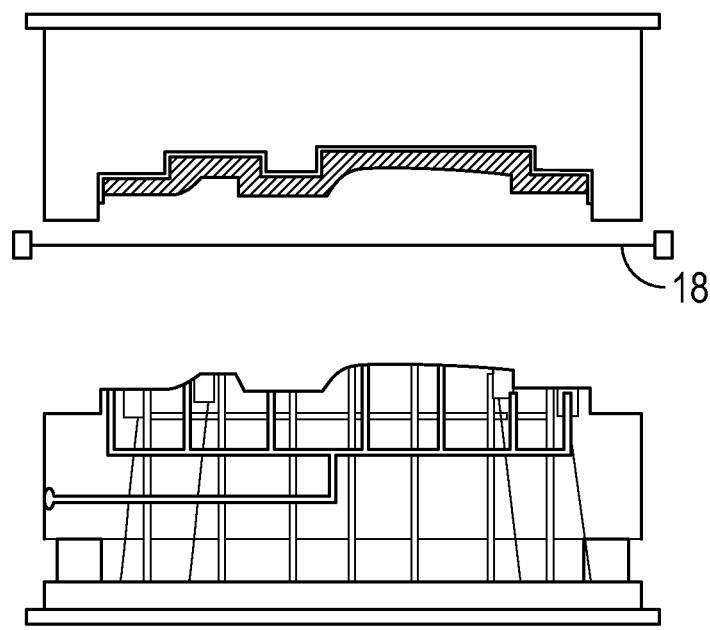

As illustrated in FIGS. 21-30, another embodiment of the present invention is illustrated. First, a nonwoven fibrous mat 12 is heated (via contact or IR heat) in an oven 16 to an appropriate processing temperature (FIGS. 21 and 22). A decorative film 18 is placed is placed in the mold cavity 32 (FIG. 23). In some embodiments the mold cavity is heated prior to placing the decorative film in the cavity. In some embodiments the decorative film is heated after being placed in the cavity and prior to contact with the non-woven material.

Figure 24:
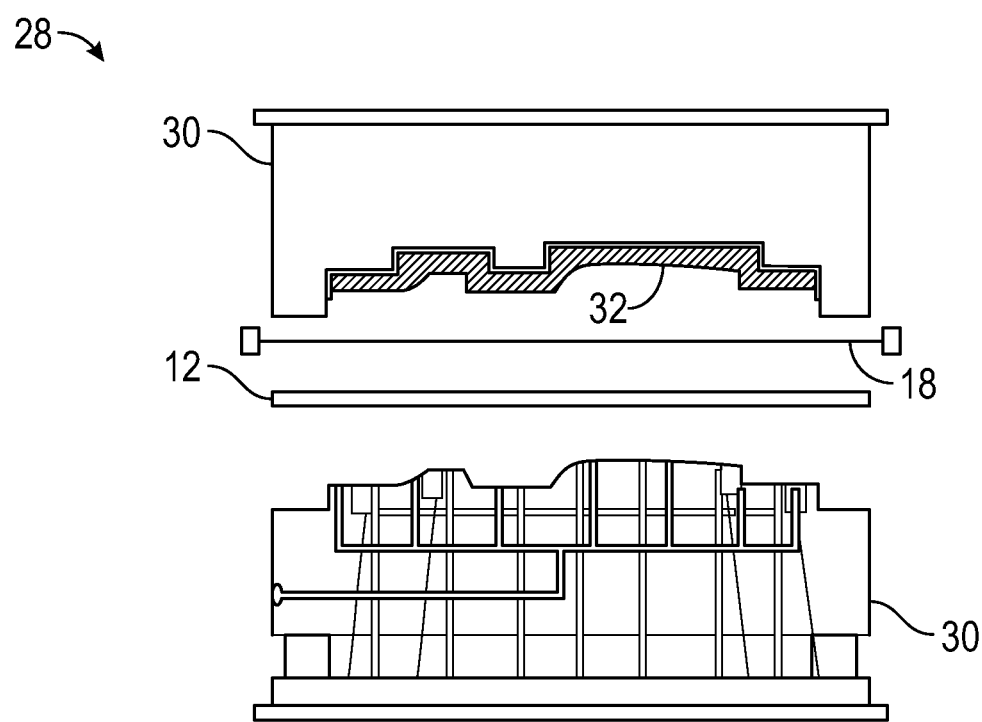
Figure 25:
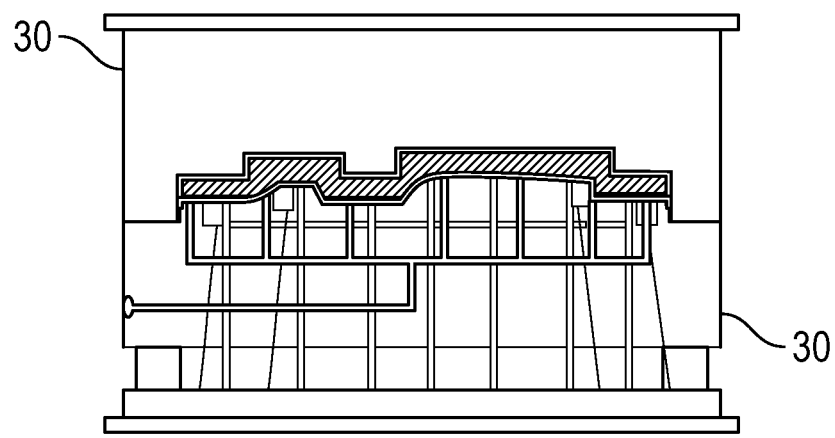

The heated non-woven material 12 is placed in the mold cavity 32 adjacent to the decorative film 18 and the tool is closed (FIGS. 24 and 25). In some embodiment the cavity 30 is porous or has small vent holes to allow any out gas to escape from the materials being molded in some embodiments the mold is close, briefly opened to allow any out gas to escape and then close to complete the molding operation. After the press is closed, graining and forming of the decorative film 18 to the nonwoven material 12 occurs and the part is formed into a final part shape. The decorative film may be perforated in order to aid in the release of trapped gasses.

Figure 26:
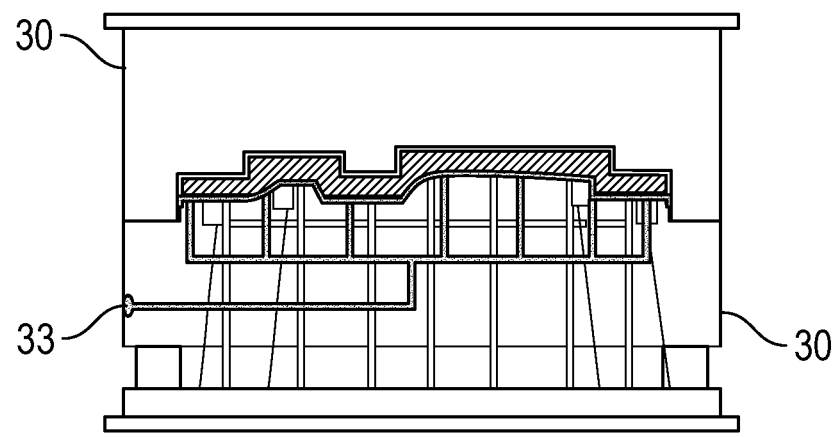
Figure 27:
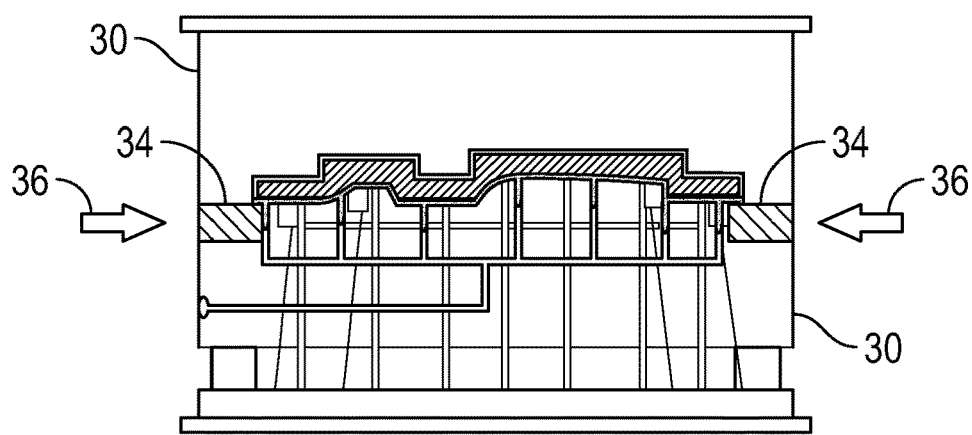

Shortly after mold close, a thermoplastic resin 33 is injected behind the nonwoven material 12, producing backside attachment features and reinforcing ribs (FIG. 26). In FIG. 27, the edge treatment slides 34 are activated in the direction of arrows 36 to finish the periphery edge of the part 38 while the tool is cold or cooling.

Figure 28:
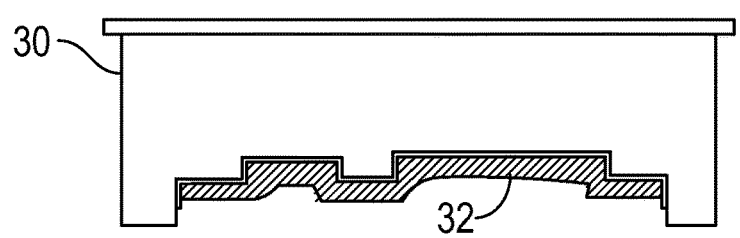
Figure 28:
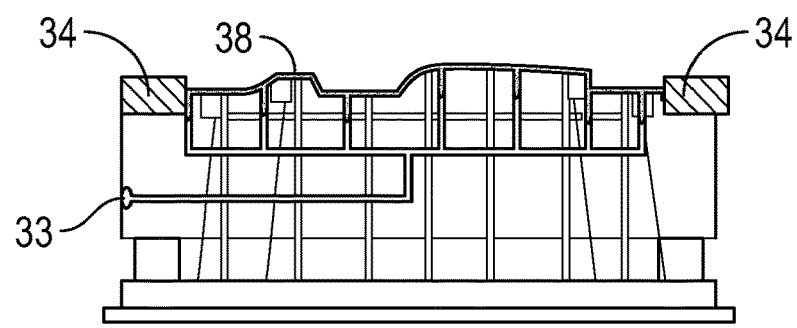
Figure 29:
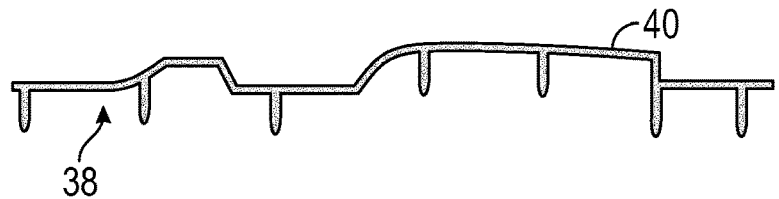
Figure 30:
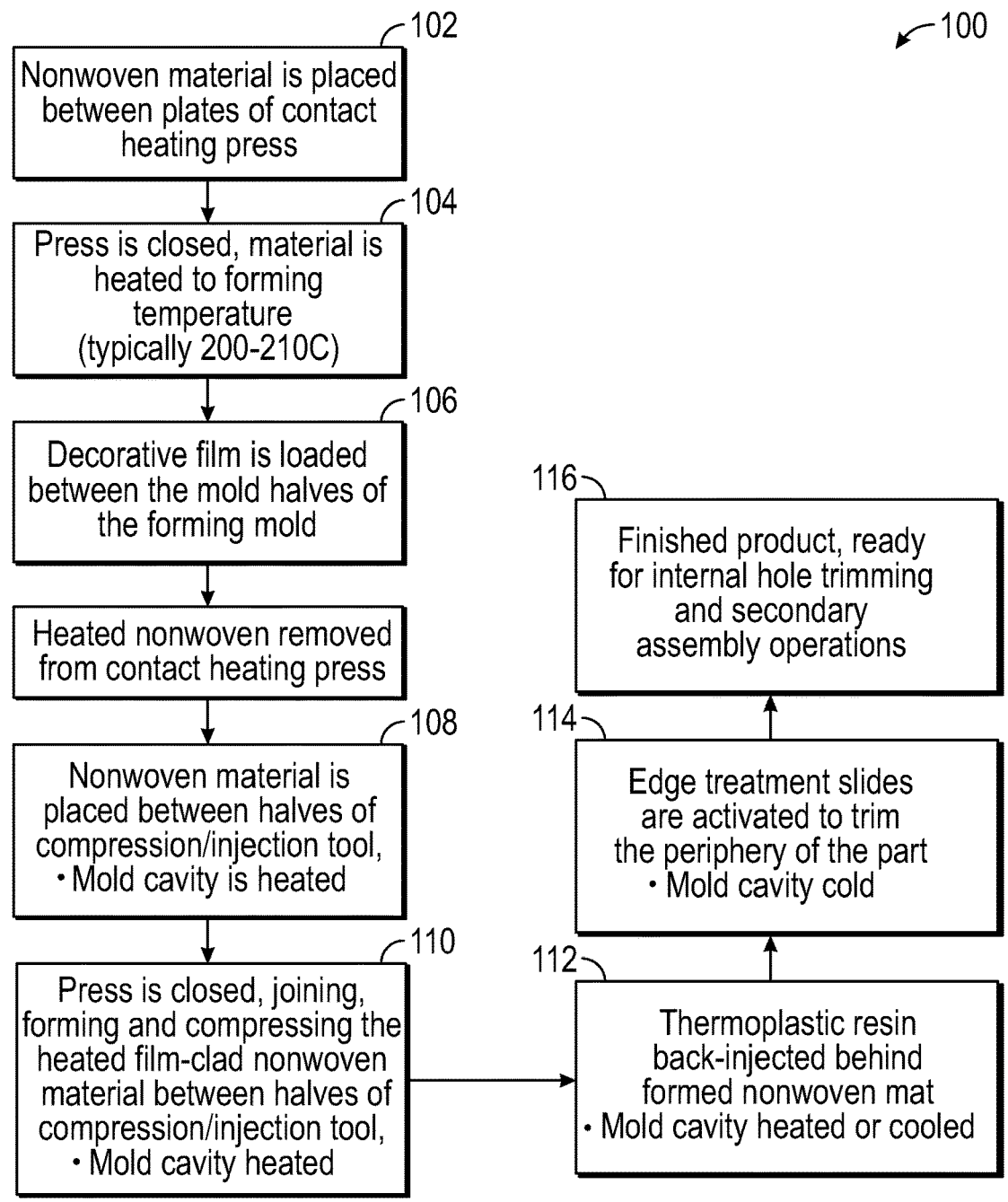

In FIG. 28, the mold opens and the part 38 is demolded. Referring now to FIG. 30 a method 100 for forming the trim component or part 38 in accordance with one non-limiting embodiment is illustrated. As mentioned above and at step 102 a nonwoven material is placed between plates of contact heating press. Thereafter and at step 104, the press is closed and the material is heated to forming temperature (typically 200-210 C). Thereafter and at step 106, a decorative film is loaded between the halves of the compression mold. Thereafter and at step 108, the heated nonwoven material is placed between halves of compression mold adjacent to the decorative film, and the mold cavity is heated. Thereafter and at step 110, the press is closed, forming and compressing the heated nonwoven material and decorative film between halves of compression/injection tool and the mold cavity is heated. Thereafter and at step 112, a thermoplastic resin is back-injected behind the formed nonwoven mat while the mold cavity heated. Thereafter and at step 114, edge treatment slides are activated to trim the periphery of the part and the mold cavity is cold or unheated. At step 116, the finished product is removed from the tool and is, ready for internal hole trimming and secondary assembly operations.

In any of the above embodiments a barrier layer may be applied to the second surface of the non-woven mat prior to injecting the thermoplastic resin. The barrier layer can be a thermoplastic material with a higher melting temperature than the thermoplastic material being injected into the mold. Without being bound by theory it is believed that the barrier layer can help isolate the decorative layer from the temperature and pressure of injection molded material thereby improving the finish of the final part. The barrier layer can have a thickness of 0.1 to 1.1 mm.

Some advantages of the embodiments of this invention include: improved appearance; well defined grain, sharp radii and uniform surface gloss; first surface finish achieved without the need for a secondary IMG lamination step; surface gloss adjustable via temperature setting of mold cavity surface; cost savings: a first surface finished product formed, back injected, and perimeter trimmed in a single tool; no adhesives between top coating (film or spray) and nonwoven substrate or material; the mass of product is minimized; reduced/minimal thickness topcoat used when formed with a nonwoven substrate; a low area weight nonwoven with back-injected ribbing.

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "bottom" and "top" are used herein, unless otherwise noted, merely for convenience of description, and are not limited to any one position or spatial orientation. The numerical ranges described herein are non-limiting ranges. Values outside of the described non-limiting ranges are considered to be within the scope of various embodiments.

The modifier "about" used in connection with a quantity is inclusive of the stated value and has the meaning dictated by the context (e.g., includes the degree of error associated with measurement of the particular quantity).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A method of forming a trim panel (38), comprising:
placing a non-woven mat of material (12) in a heating press (16);
heating the material (12) to a predetermined temperature;
applying a decorative film (18) to a first surface of the heated material (12) to create a bilaminate (26);
placing the bilaminate (26) into a cavity (32) of a forming mold (28) such that the decorative film (18) is facing the cavity (32);
heating half of the cavity (32);
closing the forming mold (28); and
injecting a thermoplastic resin (33) into the forming mold (28) having a heated cavity such that the thermoplastic resin is adhered to a second surface of the material (12) which is part of the bilaminate, the second surface being opposite to the first surface.

2. The method as in claim 1, wherein the decorative film (18) is applied to the material via a contact roller (20) of a roller system (22).

3. The method as in claim 1, wherein the decorative film (18) is perforated.

4. The method as in claim 1, wherein the decorative film (18) consists of a layer of thermoplastic olefin laminated to a layer of foam.

5. The method as in claim 1, wherein the decorative film (18) is a thermoplastic olefin.

6. The method as in claim 1, wherein injection pressures of the thermoplastic resin (33) are limited using sequential valve gating, foaming agents, or flow enhancers in order to reduce injection pressure.

7. The method as in claim 1, further comprising opening and closing the mold (28) prior to injecting the thermoplastic resin (33).

8. The method as in claim 1, wherein the predetermined temperature is in the range of 200-210 degrees Celsius.

9. A method of forming a trim panel (38), comprising:
placing a non-woven mat of material (12) in a heating press (16);
heating the non-woven mat (12) to a predetermined temperature;
heating half of a cavity (32) of a forming mold;
inserting a decorative film (18) in the cavity (32) of the forming mold (28);
removing the heated non-woven mat from the heating press and inserting between a half of the forming mold and the decorative film such that a first surface of the non-woven mat contacts the decorative film, wherein inserting the decorative film occurs after heating the cavity;
closing the forming mold (28); and
injecting a thermoplastic resin into the forming mold such that the thermoplastic resin is adhered to a portion of a second surface of the material, the second surface being opposite to the first surface.

10. The trim panel as in claim 9, wherein the decorative film (18) is perforated.

11. The method as in claim 9, wherein the decorative film (18) consists of a layer of thermoplastic olefin laminated to a layer of foam.

12. The method as in claim 9, wherein the decorative film (18) is a thermoplastic olefin.

13. The method as in claim 9, further comprising heating the decorative film (18) prior to placement in the cavity (32) of the forming mold (28).

14. The method as in claim 9, further comprising heating the decorative film (18) after placement in the cavity (32) of the forming mold (28) but prior to inserting the non-woven mat.

15. The method as in claim 9, further comprising opening and closing the tool (28) prior to injecting the thermoplastic resin (33).

16. The method as in claim 9, wherein the predetermined temperature is in the range of 200-210 degrees Celsius.

17. A method of forming a trim panel (38), comprising:
placing a non-woven mat of material (12) in a heating press (16);
heating the material (12) to predetermined temperature;
applying a thermoplastic topcoat (44) into a cavity (32) of a tool (28);
heating half of the cavity (32);
placing the material (12) into the heated cavity (32) such that a first surface of the material is adhered to the thermoplastic topcoat (44);
closing the tool (28); and
injecting a thermoplastic resin (33) into the tool (28) such that the thermoplastic resin is adhered to a second surface of the material (12), the second surface being opposite to the first surface.

18. The method as in claim 17, wherein the topcoat (44) is sprayed into the cavity (32).

19. The method as in claim 17, further comprising opening and closing the tool (28) prior to injecting the thermoplastic resin (33).

20. The method as in claim 17, wherein the predetermined temperature is in the range of 200-210 degrees Celsius.

* * * * *